April 15, 1969    H. L. LINDSTROM    3,438,205
WATER SKIMMER
Filed March 15, 1967    Sheet 1 of 2
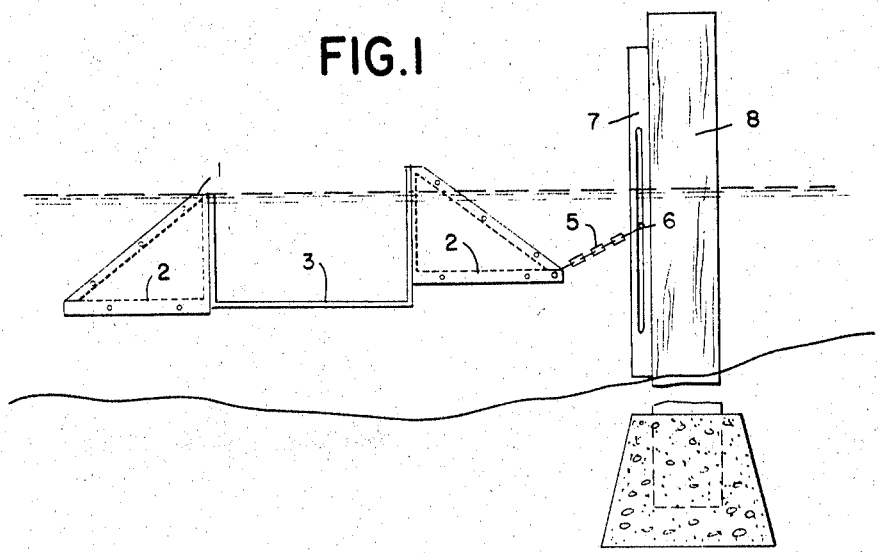
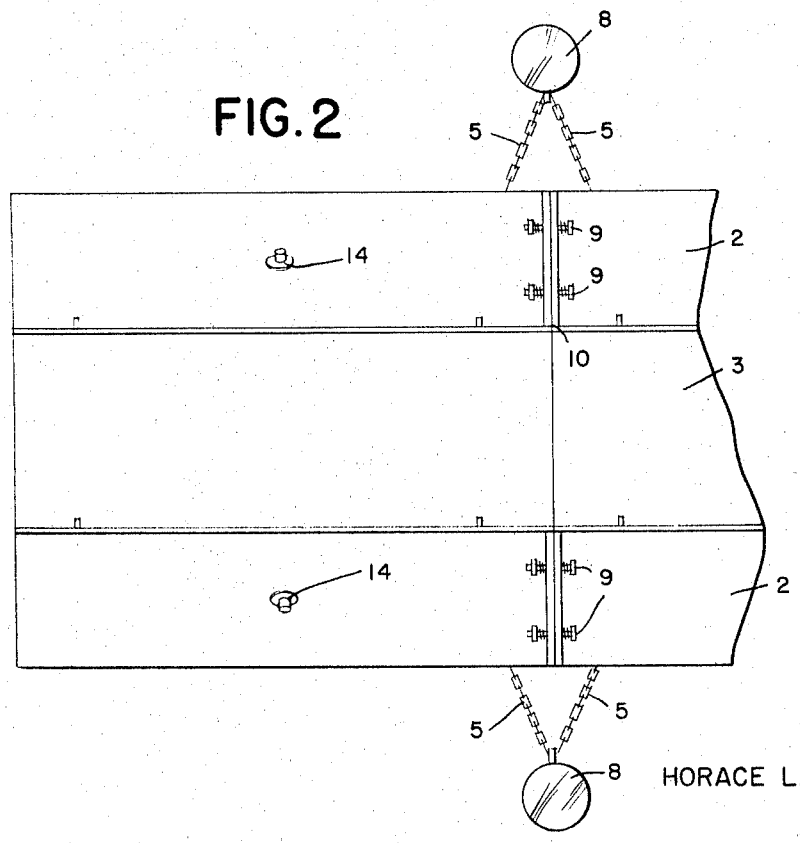
INVENTOR.
HORACE L. LINDSTROM

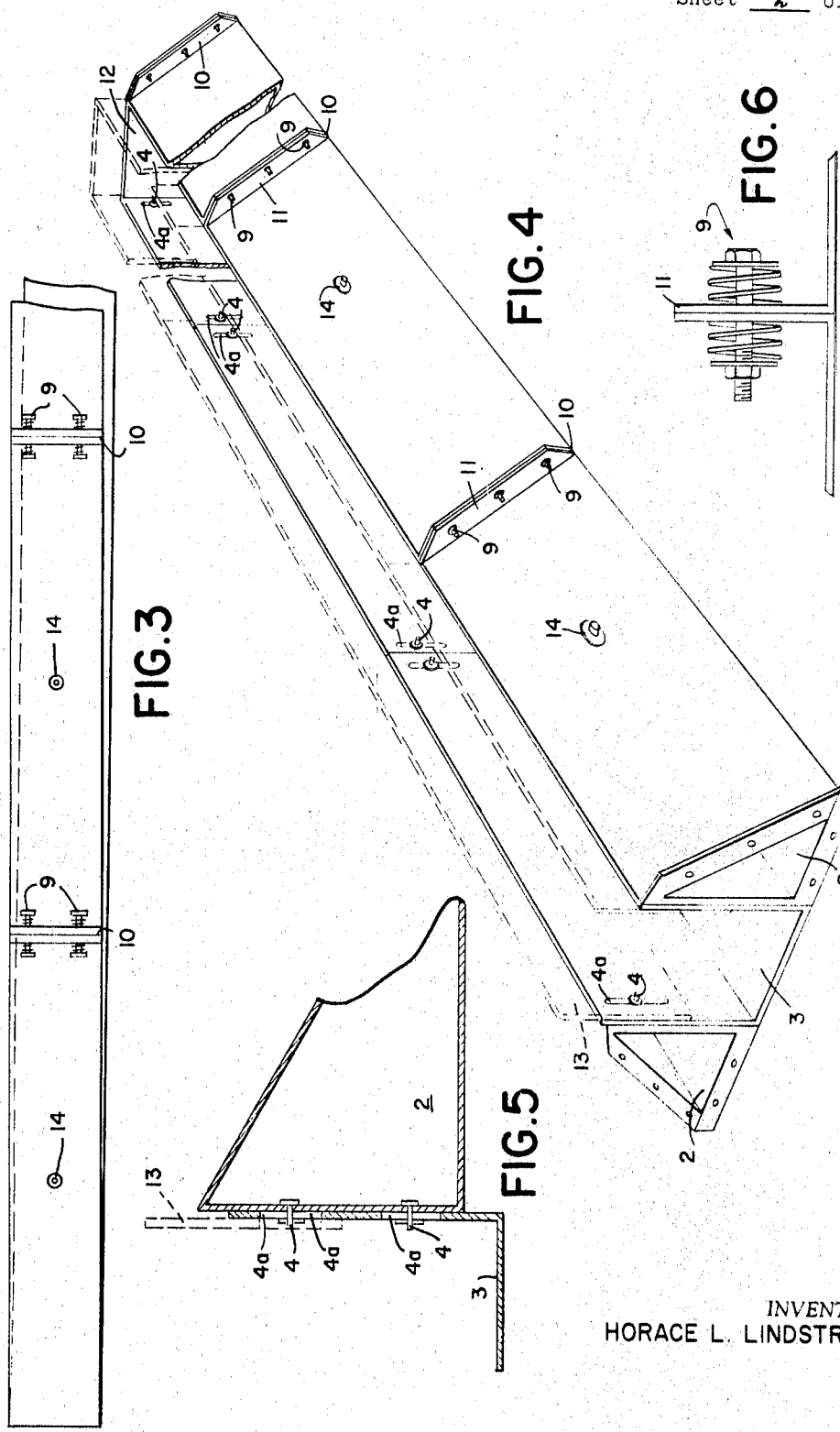

3,438,205
WATER SKIMMER
Horace L. Lindstrom, State Highway Rte. 73,
Maple Shade, N.J. 08052
Filed Mar. 15, 1967, Ser. No. 623,302
Int. Cl. E02b *1/00;* B01d *17/00;* C02b *9/00*
U.S. Cl. 61—1                    9 Claims

ABSTRACT OF THE DISCLOSURE

This invention pertains to a floating water skimmer comprising a trough having a bottom and two sides and adjustable water flow control means to regulate the water flow into the trough. Ballasts or floats are connected to the sides of the trough to regulate its floating depth in the water and may be used to regulate the water flow into the trough.

SUMMARY OF THE INVENTION

This invention pertains to a floating water skimmer to effect removal of water from large bodies of water such as streams, lakes and rivers. The water level in the trough portion of the skimmer may be regulated by several different features. The skimmer is constructed so that it will rise and fall with the level of the water in the stream, lake or river. Also, the skimmer, which is in sections, is flexible at the joints of connection so that it may be used in turbulent water.

It is an object of this invention to provide a method whereby water, which may contain sludge and pollutants, may be removed from large bodies of water such as streams, lakes, ponds and rivers.

It is another object of this invention to provide a method whereby water substantially free of fish and debris may be removed from large bodies of water.

Another object is to provide a water skimmer to effect the removal of a controlled amount of water from large bodies of water.

Still another object is to provide a water skimmer for removal of controlled amounts of water from large bodies of water and which may be used in turbulent water.

Still another object is to provide a method for controlling the amount of water entering the trough of the skimmer.

BRIEF DESCRIPTION OF THE DRAWINGS

FIG. 1 is an end view of the skimmer depicting the water trough, floats, anchoring means and water flow control means, and also illustrates the position of the floats in relationship to the trough when said floats are used to regulate the flow of water;

FIG. 2 is a top view of the skimmer illustrating the water trough, floats or ballasts, connecting joints and anchoring means;

FIG. 3 depicts a longitudinal view of the skimmer showing several sections connected together;

FIG. 4 is a detailed view of the skimmer comprising the water trough, floats or ballasts, water flow control means, and joints, shown broken away at one of the connecting joints;

FIG. 5 is a sectional view of means of connecting the trough to the floats or ballasts and optionally to connect flow control gates to the trough; and FIG. 6 is a sectional view depicting the joints formed by connecting a plurality of sections of the trough and floats together with spring-loaded bolts.

DESCRIPTION OF THE PREFERRED EMBODIMENTS

Referring to the drawings, the embodiment of this invention comprises a skimmer 1 for removing water from large bodies of water. The skimmer 1 comprises a trough 3 positioned between and connected to floats or ballasts 2. Adjustable or locking means 4 and 4a for varying the position of the trough 3 with respect to the ballasts are provided. Flow control gate 13, which is an optional feature, when used may be used either alone or in conjunction with the ballasts to regulate the water flow into the trough. The water flow control gates may be adjusted to regulate the amount of water flow into the trough 3 by the same means or similar as the ballasts are adjusted. The said ballasts 2 and/or flow gates 13 may be adjusted to permit water to flow at varying rates over the edge of the skimmer and into the trough 3.

The skimmer 1 is held in position by a flexible anchoring means such as by ropes, chains or cables 5 which are attached via a slip ring 6 and rod 7 to piling 8. The slip ring 6 and rod 7 permit the skimmer 1 to rise and fall with the water level of the stream, river, pond, lake, etc.

The longitudinal sections of the skimmer 1 are joined together by spring-loaded bolts 9 passing through flanges 11 at joints 10. The spring-loaded bolts 9 permit the skimmer to flex with the turbulent conditions of the water. That is, when there are waves the skimmer 1 will flex or bend instead of having to undergo great strains and stresses. The trough 3 may vary in depth with the shallow end being extended out into the water. It is not necessary that the depth of the trough 3 vary in order to obtain a good supply of water; however, it is preferred that the bottom of the trough be slanted toward the shore.

The floats or ballasts are ballasted in such a way as to permit their use as a means to control the amount of water entering the trough. The top edge of a float 2 on one side of the trough 3 may be raised above the surface of the water and the float 2 on the other side of the trough positioned at a predetermined depth below the surface of water thus permitting water to flow into the trough 3.

The adjustable flow control gates 13 when extended to their raised position extend above the surface of the water and when lowered permit the water to flow into the trough 3. The leading edge of the skimmer 1 is adjusted to permit water to flow into the trough 3 at a predetermined and controlled rate. The preferred rate of water flow over the water flow control means and into the trough is about $\frac{1}{64}$ to about 2 inches. The adjustable water flow regulating means is positioned to allow a predetermined amount of water to enter the trough 3 by adjustment slots 4a and locking means which may be studs, nuts and bolts, screws, etc. However, the rate of flow of water permitted to enter the trough 3 may exceed the aforementioned limitations should it be desired to do so.

It is preferred to permit the flow of water into the trough 3 from one side only and the water flow regulating means may be so adjusted. However, water may be allowed to flow into the trough from both sides. Water is not permitted to enter from the end of the trough 3 by end member 12.

The floats 2 maintain the skimmer 1 at a predetermined and controlled depth in the water. The trough 3 carries the water to the shore where it is removed. Any means such as pumps or siphons or gravity may be used to remove the water from the trough 3.

The skimmer 1 may comprise one or a plurality of trough sections and float sections to form a unitary structure. The sections are held together at joint 10 by flanges 11 secured with spring-loaded bolts 9. It is expected that some water will flow either into or out of the trough when the joints are in the flexed position. However, the water change will be so slight that it will cause little or no effect on the operation of the system.

The trough 3 may be adjusted to varying positions of depth with relationship to the ballasts or floats 2 by securing means 4 and 4a. The water flow control gate 13 may be regulated or adjusted in the same manner. The securing means may be studs, nuts and bolts, screws, etc.

Equal quantities of material such as water, air, etc. may be added to the float via valve 14 to regulate the depth of the skimmer in the water and also to regulate the water flow into the trough. Differential quantities of ballasting material may be employed in the various sections of the floats should such be desired. The floats may be triangular in cross section or any other geometric shape.

The depth of the trough 3 may vary, being shallow toward the outer end of the trough and gradually getting deeper next to the shore. The width may vary in a like manner. A plurality of sections of the skimmer may be connected together in order to make it as long as desired.

The water flows over the edge of the skimmer, into the trough and is removed at the bank or shore end either by siphon or pumps or gravity.

The skimmer may be constructed of any rigid material such as metal, plastic, rubber, wood, etc. The height and width of the skimmer may vary to suit the desired needs. However, from experience it has been found to limit the depth to less than 4 feet and the width to less than 8 feet. Of course, these dimensions may vary according to the particular needs and means of handling the skimmer.

The skimmer may be anchored in place by flexible connection means to pilings. Also connected to the pilings may be a means for raising the skimmer out of the water and lowering it back into the water when it is desired to do so. Such raising and lowering may be necessitated by freezing of the water, storms, repairing and maintenance of the skimmer, etc.

The skimmer may be raised out of the water by any means such as motors located on the top of the pilings or on the skimmer, a shaft, having lifting means such as cables extending from the shaft to the float, attached to the pilings, etc.

Although the invention has been described in considerable detail with particular reference to certain preferred embodiments thereof, variations and modifications can be effected within the spirit and scope of the invention as described hereinbefore, and as defined in the appended claims.

I claim:
1. A water skimmer for removing variable amounts of water from a water supply, comprising:
   an elongated trough, closed at the bottom, having side walls and end walls;
   floats attached to the exterior of each of said side walls;
   a flow control gate attached to at least one of said side walls; and
   means for adjusting said gate vertically with respect to said trough maintaining the upper edge of said gate at variable distances beneath the water surface to regulate the flow of water from said water supply to said trough.

2. A water skimmer for removing variable amounts of water from a water supply as described in claim 1, further comprising:
   means for varying the buoyancy of said floats, and
   means for adjusting said floats vertically with respect to said side walls.

3. A water skimmer as described in claim 2, wherein:
   said floats are elongated and coextensive with said trough, and
   said flow control gate comprises one of said floats.

4. A water skimmer as described in claim 3, comprising a plurality of sections formed between said end walls, said sections being flexibly connected whereby the skimmer flexes to approximately conform to the surface contour of turbulent water.

5. A water skimmer as described in claim 4, wherein said sections are connected by spring loaded bolts.

6. A water skimmer as described in claim 2, wherein said flow control gate comprises a plate mounted to one of said side walls and vertically adjustable with respect to said side wall.

7. A water skimmer as described in claim 6, wherein a second plate is mounted to the opposite side wall from said first plate, and is vertically adjustable with respect to said side wall, whereby a flow control gate is provided on each side of said trough.

8. A water skimmer as described in claim 7, comprising a plurality of sections formed between said end walls, said sections being flexibly connected whereby the skimmer flexes to conform to the surface contour of turbulent water.

9. A water skimmer as described in claim 8, wherein said sections are connected with spring loaded bolts.

References Cited

UNITED STATES PATENTS

| 2,497,177 | 2/1950 | McClintock et al. | 210—242 X |
| 2,608,300 | 8/1952 | Small | 210—51 |
| 2,876,903 | 3/1959 | Lee | 210—242 |
| 3,218,811 | 11/1965 | Barall et al. | 61—45 |

JACOB SHAPIRO, Primary Examiner.

U.S. Cl. X.R.

210—121, 242